United States Patent [19]
LaViolette

[11] 3,812,370
[45] May 21, 1974

[54] LOW COST PORTABLE ROOM AIR CLEANER

[75] Inventor: Fred G. LaViolette, Schenectady, N.Y.

[73] Assignee: Environment/One Corporation, Schenectady, N.Y.

[22] Filed: Sept. 7, 1971

[21] Appl. No.: 178,106

[52] U.S. Cl......... 250/527, 55/244, 55/214, 55/279, 55/316, 55/473, 55/483, 55/502, 55/509
[51] Int. Cl............................................. B01d 31/00
[58] Field of Search ............ 55/102, 212, 213, 234, 55/244, 274, 323, 279, 327, 333, 472, 473, 483, 497, 499, 502, 507, 509, DIG. 34, 316; 23/260, 284; 250/527; 204/193

[56] References Cited
UNITED STATES PATENTS

| | | | |
|---|---|---|---|
| 816,371 | 3/1906 | Platz | 261/119 R |
| 2,013,136 | 9/1935 | Cornelius | 55/DIG. 34 |
| 2,881,854 | 4/1959 | Vehre | 55/316 |
| 3,094,400 | 6/1963 | Blanton | 55/102 |
| 3,177,635 | 4/1965 | Cawl et al. | 55/274 |
| 3,190,059 | 6/1965 | Bauder et al. | 55/499 |
| 3,247,652 | 4/1966 | Annas et al. | 55/484 |
| 3,509,697 | 5/1970 | Dewey et al. | 55/316 |
| 3,606,740 | 9/1971 | Ballennie | 55/500 |
| 3,654,747 | 4/1972 | Remick | 55/316 |
| 3,691,736 | 9/1972 | Neumann | 55/484 |
| 3,249,228 | 5/1966 | Arvanitakis | 55/500 |

FOREIGN PATENTS OR APPLICATIONS

| | | | |
|---|---|---|---|
| 1,448,873 | 8/1966 | France | 55/385 |
| 1,228,872 | 4/1971 | Great Britain | 55/504 |

OTHER PUBLICATIONS
Cambridge Side Flo & Side Cap Air Filters Bulletin, 180 C.
Cambridge Filter Corp., Syracuse, New York, pages 1–8, 7/67.

Primary Examiner—Bernard Nozick
Attorney, Agent, or Firm—Charles W. Helzer

[57] ABSTRACT

A portable, compact, low cost, highly efficient room air filter for cleaning the room air of homes, offices and the like and which can be placed in the room in the manner of an article of furniture and plugged into a conventional household outlet of alternating electric current without requiring complex air ducting installations or other similar modifications. The room air filter includes a housing and a high volume air fan mounted within the housing. The fan has its discharge directed into a high pressure plenum formed in the housing and has its intake disposed adjacent an intake grill mounted on the exterior of the housing for supplying suction air to the high volume fan. A coarse fiber, large particle prefilter and a charcoal or other type odor filter are disposed in the suction air passageway between the intake grill and the intake of the high volume fan, and a relatively low cost fine fiber small particle filter is disposed adjacent to and defines one side of the high pressure plenum chamber into which the high volume fan discharges at relatively high pressure. The small particle filter has its discharge diffusely directed exteriorly of the housing whereby suction of the room air through the intake grill, the rough particle prefilter and the odor filter into the fan and the high velocity discharge of the fan into the high pressure plenum and through the fine fiber small particle filter results in diffuse circulation and cleaning of the room air whereby substantially 90 percent of all particles usually found in room air which are larger than 0.005 microns in size are removed along with a substantial reduction of odors.

16 Claims, 10 Drawing Figures

INVENTOR
FRED G. LaVIOLETTE

Charles W. Helzer
ATTORNEY

FIG. 5

INVENTOR
FRED G. LaVIOLETTE

LOW COST PORTABLE ROOM AIR CLEANER

BACKGROUND OF THE INVENTION

1. Field of Invention

This invention relates to a new and improved, low cost, highly efficient, portable room air filter.

More particularly, the invention relates to a room air filter for cleaning the air of average sized rooms of a home or office and the like, and which can be placed in the room in the manner of an article of furniture without requiring air ducting installations or other modifications to the construction of the room, and may be readily installed for operation merely by plugging into a conventional household or office outlet of alternating electric current.

2. Background Problem

Room air filters have been available in public in a number of forms. Currently, the most popular room air filters employ electrostatic precipitators as the means for filtering out extremely small particles down to a size range of the order of 0.005 microns in diameter. Such electrostatic precipitators which attain effective cleaning of the air do by their nature produce some ozone during operation due to electrical discharges inherent to the ionizing process used to place electrical charges on the particles to be removed from the air and which ozone can be harmful to health if the ozone concentration reaches levels where it can be smelled. Conversely, for such electrostatic precipitators which are designed to release very small amounts of ozone so that harmful concentrations of ozone are not normally produced in room air by utilizing a lesser degree of ionizing electrical discharge, the cleaning effectiveness is reduced or impaired to the point that little or no benefit is derived from operation of such air cleaning devices. Further, it is a known characteristic of electrostatic precipitators that they become more and more inefficient in service as dirt, dust and other particles build up during operation to the point that they perform little or no cleaning at all, and perhaps can result in discharging previously collected dust, particles, etc. back into the air stream should the precipitator plates break down the air gap and arc. To obviate these difficulties, the present invention was devised.

SUMMARY OF THE INVENTION

It is therefore a primary object of this invention to provide a new and improved, low cost, highly efficient, portable room air filter which is capable of removing up to 90 percent of all particles usually found in room air and having a size range down to 0.005 microns in diameter, while also producing a substantial reduction of odors in the room.

Another object of the invention is to provide such a room air filter which can be placed in a room in the manner of an article of furniture, can be readily fitted into any available space in the room or office and easily adapted to the decor of the room, and which merely can be plugged into a conventional household outlet of alternating electric current to be conditioned for operation without requiring ducting installations or other modifications to the room construction.

Still another object of the invention is to provide an improved room air filter having the above characteristics and which does not employ electrostatic precipitation, is relatively inexpensive, and produces no ozone during operation.

A still further object of the invention is to provide a room air filter of the above type which becomes more and more efficient in its air cleaning action as it becomes dirty in service up to the point that little or no airflow takes place through the unit, at which point the filter elements must be changed.

In practicing the invention a portable, compact, low cost, efficient room air filter is provided for cleaning the room air of homes, offices and the like and comprises a housing having a high volume air fan mounted therein with its discharge directed into a relatively high pressure plenum chamber formed in the housing and having an intake opening disposed adjacent an intake grill mounted on the side of the housing for supplying suction air to the high volume fan. A coarse fiber, large particle prefilter is disposed in the air passageway intermediate the intake grill and the intake of the high volume fan, a relatively low cost, fine fiber small particle filter is disposed adjacent to and defines one side of the high pressure plenum chamber and a charcoal or other type odor filter is disposed in the air passageway either intermediate the coarse fiber, large particle prefilter and the intake of the high volume fan or following the fine fiber small particle filter and spanning over the area through which the filtered airflow out of the fine fiber, small particle filter discharges. The discharge from the small particle filter is diffusely directed exteriorly of the housing through a coarse decorator grill cloth covering a portion of the housing and which further serves to diffuse the air flow into and through the room.

The relatively low cost fine fiber small particle filter comprises a readily replaceable assembly including an outer support member of metal or cardboard that defines the intake area of the small particle filter. Fine fiber filter media shaped in the form of a multiplicity of adjacent pockets is secured on the outer support member with the pockets extending out in the direction of airflow and a coarsely woven or other supporting surface or net is secured to and confines the configuration of each of the pockets whereby adjacent pockets do not blow out to an extent sufficient to contact one another and thereby restrict airflow through any of the pockets, and a substantially even pressure gradient is maintained across all of the sides of all of the pockets to assure maximum utilization of the surfaces of the fine particle filter media as well as to assure a steady, large volume flow of filtered air.

The fine fiber small particle filter assembly is removably mounted within the housing by means of an internal, inflexible mounting ring or flange secured within the housing at a location defining one side of the relatively high pressure plenum chamber. A first filter assembly gasket of a pliable sealing material such as foam rubber is secured between the mounting ring and the outer support member comprising a part of the small particle filter assembly. A retainer comprising a gasket of a pliable sealing material such as foam rubber, or other comparable structure is secured around at least a portion of the periphery of the mounting ring and spaced from the first filter assembly gasket a short distance so as to define a retaining gap for receiving the edges of the outer support member of the small particle filter assembly and firmly gripping or holding the small particle filter assembly in place within the housing. To facilitate removal and replacement of the small particle filter, one of the remaining walls of the housing portion that defines the relatively high pressure plenum chamber is at least partially removable to provide access to the small particle filter assembly for removal and replacement as it becomes dirty in service. It is the small particle filter primarily which becomes more and more efficient in service as it becomes dirty in so far as the air cleaning factor is concerned; however as collected particles build up in the small particle filter it can become so clogged that little or no airflow takes place through the room air filter assembly. At this point the small particle filter should be replaced for effective room air cleaning.

The housing preferably is evenly shaped in contour so as to have a multiplicity of different sides upon which it can be supported to facilitate placement in any available space in a room or office either on one side or another, and the components of the room air filter are securely and firmly mounted within the housing so as to assure reliable operation despite the manner of placement of the housing on any one of its available multiplicity of supporting sides. This feature together with the provision of the changeable exterior decorator cloth through which the clean air is diffusely discharged on the outlet side of the small particle filter, and which readily can be replaced with a decorator cloth similar to or harmonizing with that employed in the drapes, carpeting or other color coded articles within a room or office, allow the room air filter to be incorporated into the furnishings of the room easily, and yet fit into the decor of the room.

If desired, additional features such as a humidifier, a deodorant spray, antibacterial spray, or the inclusion of an ultraviolet lamp for treating air passing through the high pressure plenum chamber to convert gaseous components in the air to particles that then are filtered out by the small particle filter, may be included to provide additional air treatment processing. Further, for some installations an indicator of the need for changing particle filters can be included by merely sensing the airflow through or pressure drop across either the small particle filter or the coarse prefilter and charcoal or other type odor filter, and providing an indication of a reduction of airflow or of an excessive pressure drop thereby indicating the need for a filter change. Further, for certain installations automatic timed operation of the room air filter can be provided so as to assure that all room air has been filtered and cleaned in advance of occupancy.

BRIEF DESCRIPTION OF THE DRAWINGS

Other objects, features and many of the attendant advantages of this invention will be appreciated readily as the same becomes better understood by reference to the following detailed description, when considered in connection with the accompanying drawings, wherein like parts in each of the several Figures are identified by the same reference character, and wherein:

FIGS. 2, 2A and 2B are fragmentary sectional views of a portion of the housing of the room air filter shown in FIG. 1, and illustrate two different forms of novel, low cost, low noise constructions for mounting the small particle filter assembly used in room air filter;

FIGS. 3, 3A and 3C, illustrate the construction of a preferred mounting structure for the coarse prefilter and a charcoal or other type odor filter elements comprising a part of the unit;

DETAILED DESCRIPTION OF PREFERRED EMBODIMENT

Figure 1:
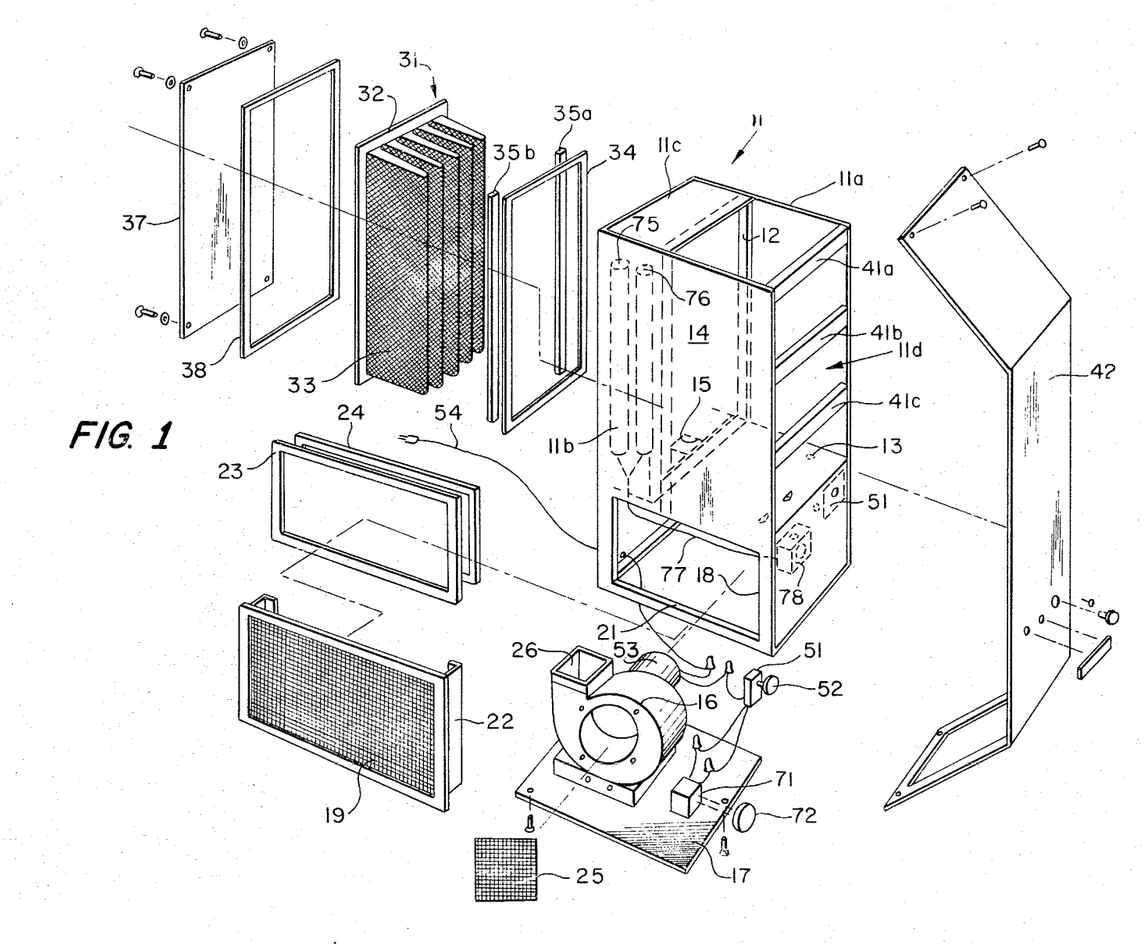
FIG. 1 is a perspective, partially disassembled view of a new and improved room air filter constructed in accordance with the invention.

The room air filter shown in FIG. 1 is comprised by a housing 11 of generally regular, rectangular configuration providing a multiplicity of different sides upon which the housing can be supported in order to provide for versatility in the placement of the room air filter within a room or office. The housing 11 includes an internal mounting ring or flange 12 which in conjunction with a platform partition 13 extending across the longitudinal dimension of housing 11, defines a relatively high pressure plenum chamber area 14. The partition 13 has an opening 15 formed therein through which a high volume fan 16 has its outlet or discharge duct 26 extending so as to discharge air into the high pressure plenum chamber 14. The fan 16 may be a conventional squirrel cage induction motor driven blower or other similar, standard, commercially available fan for producing a relatively high volume flow of air into the relatively high pressure plenum chamber 14. Fan 16 is bolted or otherwise mounted securely on a lower support or bottom member 17 which also may comprise on side of the housing 11.

Figures 2, 3, 3A, 3B:
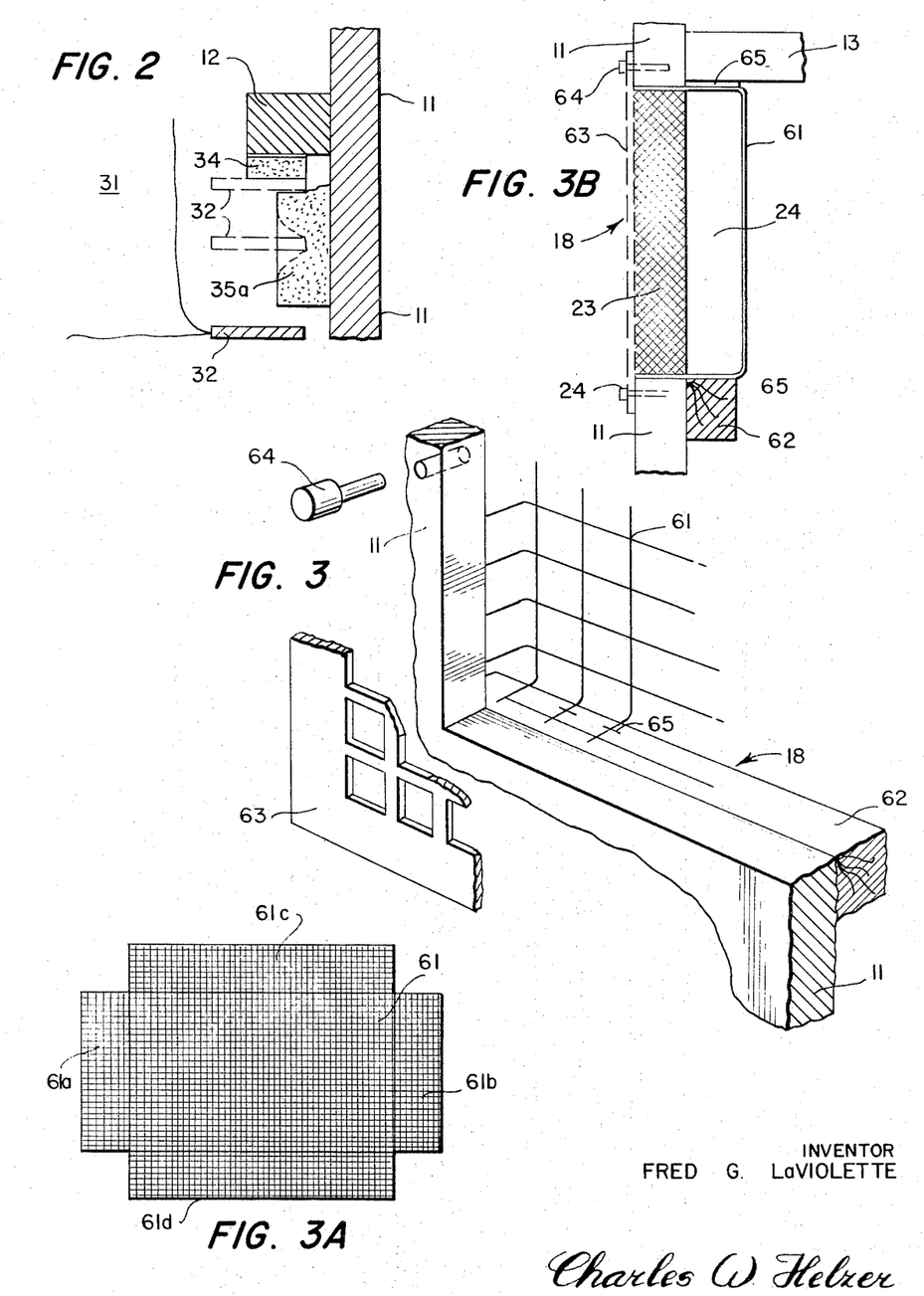

Fan 16 when properly mounted within housing 11 in the space below partition 13, has its intake disposed adjacent to an opening 18 over which an intake grill assembly shown at 19 is secured. The intake grill assembly 19 may be formed of steel or any suitable material such as metal, plastic, wood, etc., preferably having a decorative grill work providing passage for airflow therethrough, and may be secured over the opening 18 by any known fastening means such as screws, thumb nuts, or the like. The decorative grill 19 has secured to its inner side an integral mounting flange, shown in FIG. 1 at 22 that provides U-shaped flanges which serve to support a pair of replaceable intake filters shown at 23 and 24, respectively. The intake filter 23 comprises a coarse prefilter for removing relatively large dust particles and the like, and hence may be fabricated from a coarse fiber filter media such as the fiberpad material known as "DYNEL" manufactured and sold by Union Carbide, and is of the type used conventionally in removing airborne dust particles as in the air conditioning or air heating systems. The second filter 24 preferably comprises a charcoal or other type odor filter which is disposed downstream from the coarse prefilter 23 and is employed to remove undesired odors from the suction air supplied to the high velocity fan 16 through intake grill 19. The assembly is designed so that the coarse prefilter 23 and charcoal or other type odor filter 24 readily may be slid into the supporting flange 22 for easy removal and replacement. The charcoal or other type odor filter 24 may comprise any known, commercially available activated charcoal or other type filter structure for minimizing room odors. For personnel safety during servicing and while removing and replacing the filters 23 and 24, a safety screen shown at 25 preferably is secured over the intake side of the high volume fan 16 to avoid the possibility of children or others reaching into the vanes of the fan while it is operating. Alternatively, safety interlock switches that would assure turnoff of fan 16 upon removal of the prefilter intake grill assembly 19, could be used in place of the safety screen 25, or an arrangement such as shown in FIG. 3, could be employed.

A relatively low cost but highly efficient, fine fiber, small particle filter assembly shown at 31 is designed to be mounted within the high pressure plenum chamber 14 in a manner such that air from the discharge side 26 of the high volume fan 16 passes through the opening 15 in partition 13, pressurizes the plenum chamber 14, is forced through the fine fiber, small particle filter 31. Small particle filter (31) inherently by reason of its nature, filters and diffuses the air flow which and then is directed diffusely out into the exterior space surrounding housing 11. The small particle filter assembly 31 is designed to be readily replaceable after a number of months of service and hence is of low cost construction. It is comprised by an outer support member 32 of cardboard, thin sheet metal, or other similar low cost material. The support member 32 has appended to it by any suitable fastening means such as glue, staples, clamps, etc., a fine fiber filter media such as Owens-Corning-"FM-003-¼" which is shaped in the form of a plurality of adjacent pockets, as illustrated in FIG. 1, with the pockets designed to extend out away from the pressurized plenum chamber area 14 in the direction of airflow. To support each of the individual fine fiber filter media pockets, a coarse woven supporting net, screen or other similar confining structural arrangement shown at 33, is secured over both sides of each of the individual elongated fine fiber pockets, and serves to confine the configuration of each of the pockets whereby adjacent pockets do not blow out to an extent sufficient to contact one another, a condition which would restrict airflow through the pockets. As a consequence, a substantially even pressure gradient is maintained across all of the sides of the fine fiber filter media pockets to assure maximum utilization of the surfaces of the fine fiber, small particle filter media and to assure a steady, large volume flow of air through the unit.

The fine fiber, small particle filter assembly 31 constructed in the above manner is disposed within the housing 11 by supporting it against the mounting ring or flange 12 within housing 11. To assure proper seating and sealing of the surfaces of the small particle filter assembly, a filter assembly gasket shown at 34 is secured between the mounting ring or flange 12 and the outer support member 32 of the small particle filter assembly, and the outer support member 32 (including the fine fiber filter media and support net 33) is retained in place by a retainer gasket shown generally at 35A and 35B secured around at least a portion of the periphery of the mounting ring or flange 12. The construction is best illustrated in FIG. 2 of the drawing which illustrates a fragmentary cross-sectional view of the construction looking toward the side of the housing 11. As shown in FIG. 2, the mounting ring or flange 12 which may be a one-half inch or three-fourths inch cross-section wooden member, is secured to the interior surface of the wall of the housing 11 by glue, screws, or any other known fastening means and may comprise wood or any other similar material. The filter assembly gasket 34 is secured over the inner peripheral edge of the surface of mounting flange 12 which is adjacent to the pressurized plenum chamber area 14. The filter gasket 34 is fabricated from a suitable pliable material such as foam rubber or vinyl or polyurethane foam having cross-section dimensions of the order of one-half inch by one-fourth inch or the like, and preferably is secured in place by means of a self adhesive coating or by gluing with a suitable rubber cement or the like to the mounting flange 12. The retaining gaskets 35A and 35B which preferably extend at least along each of the long dimension sides of the supporting flange 12 likewise are secured to the interior surfaces of the housing 11 by glue, etc. The retaining gaskets are placed along and engage one edge of the filter assembly gasket 34 in a manner that defines a retaining grip in the space intermediate the two foam gaskets 34 and 35 for receiving the edges of the outer support member 32 of the small particle filter assembly 31. As a result, the small particle filter assembly is firmly gripped and held in place within the housing 11. For support of illustration, the supporting flange 12 may comprise a frame or flange formed from a piece of wood with a cross-section of the order of one-half inch by three-fourths inch. The gasket 34 has a crosssection of about one-half inch by one-fourth inch and the retaining gasket 35A has a thickness of about one-half inch so that an overlap of about one-fourth inch is provided that defines the retaining grip. The retaining grip should have a spacing of less than the thickness of outer support member 32 so as to assure some compression of the gaskets 34 and 35 upon the edge of the supporting member 32 being inserted into the manner depicted in dotted outline form in FIG. 2. The result is to firmly grip or clamp the small particle filter assembly in place in an air tight and noise free manner within the housing 11 so that it in effect defines one side of the pressurized plenum chamber 14.

Figures 2A, 2B:
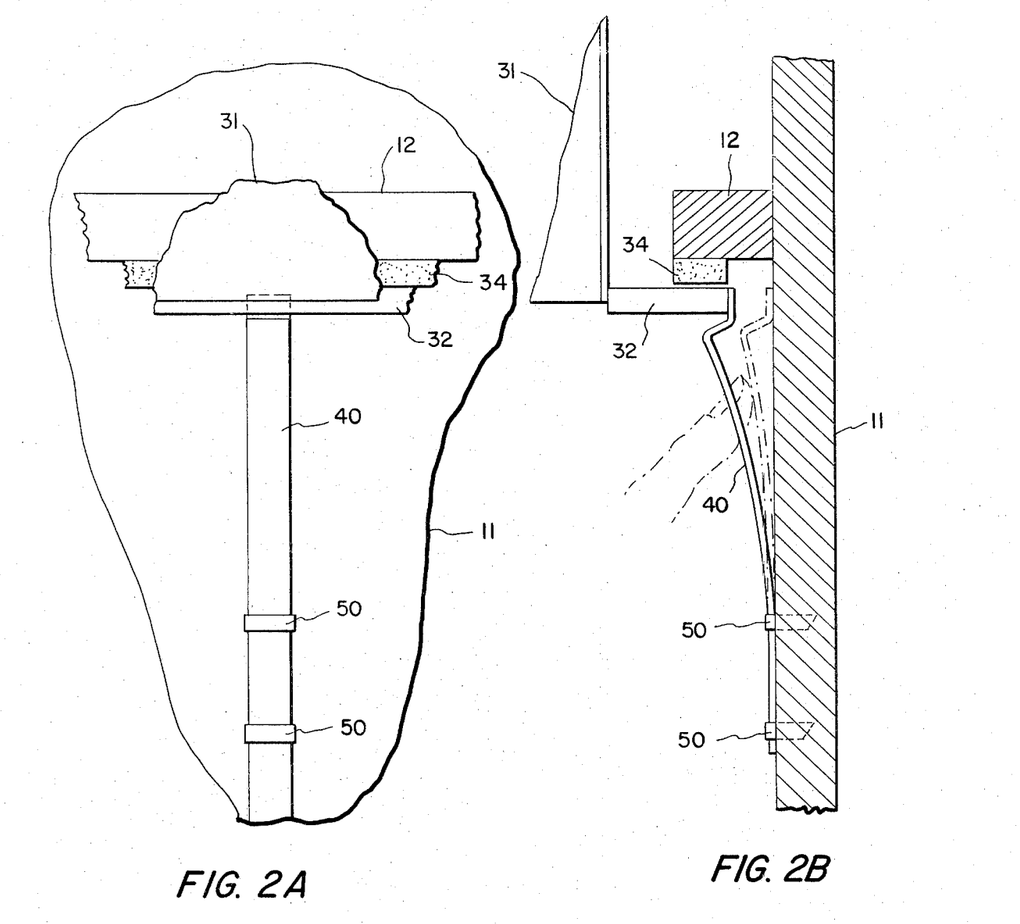

FIGS. 2A and 2B of the drawings illustrate an alternative construction for mounting the small particle filter assembly and supporting member 32 within housing 11. In this arrangement the inside edges of the flange 12 also has a sealing gasket 34 surrounding the periphery for sealing the supporting member 32. The supporting member 32 is held in place within housing 11 by means of a plurality of spaced flexible fingers 40 fabricated from spring steel or the like and having downturned ends that coact with the supporting member 32 to hold the small particle filter assembly in place. The flexible retaining fingers 40 are secured to the interior or housing 11 by means of staples 50 or other similar fasteners, and are biased so as normally to be flexed outwardly from the sides of housing 11 in the manner shown in FIG. 2B. In placing the small particle filter assembly within housing 11, the flexible retaining fingers 40 will be moved to the dotted-line position shown in FIG. 2A, and, upon support member 32 engaging and slightly compressing gasket 34, the fingers 40 will be allowed to spring back to their normal position thereby firmly retaining the small particle filter assembly within housing 11. To remove the filter assembly, the fingers are depressed to the dotted line position shown in FIG. 2B, and the assembly slid out.

The remaining opposite side of the plenum chamber 14 is formed by a solid removable panel 37 of the same material as housing 11. Panel 37 is secured over the opening in housing 11 by means of a sealing gasket 38 and screws or other suitable fastening means in a manner to assure airtight closure of the space within the pressurized plenum chamber area 14.

As seen in FIG. 1, the two opposite sides 11a and 11b of housing 11 are essentially, continuous sides with the exception of the intake opening 18 formed in the side 11b. The top 11c is a continuous solid member over the entire top of the housing and thus, defines the upper surface of the pressurized plenum chamber 14. With respect to the side indicated at 11d down to the partition 13, this entire side area of housing 11 is open, and only the divider support members 41a, 41b and 41c, are provided. These support members provide the physical support required to keep the sides 11a and 11b separated and also serve as means for supporting an elongated piece of coarsely woven decorator fabric shown at 42 over this open space and hence over the space within housing 11 into which the small particle filter assembly 31 fits and discharges. The decorator cloth 42 may be secured over this open space by any suitable fastening means such as snap fasteners and, of course, may be tailored to match or harmonize with the color of drapes, rugs or other furnishings within a room or office in a manner which fits the decor of the room. Another requirement of the decorator cloth 42 besides that of being attractive, is that it be sufficiently coarsely woven to assure that only a minimum pressure drop will occur in the clean filtered air passing through the decorator cloth. It also serves to further diffuse the flow of air from the discharge or output from the small particle filter assembly so that if one were to stand adjacent to the room air filter while it is operating, no substantial air blast will be felt.

The remaining portion of the side 11d of housing 11 below partition 13 is a solid, continuous member for enclosing the high volume fan 16 and related controls for the air filter as well as electrical wiring, and the like. A combined on-off and motor speed control shown at 51 is supported within this space and is actuated by an externally accessible control knob 52. The motor control 51 may be comprised by a conventional, commercially available, solid state phase control circuit which is capable of turning on and turning off the high volume fan motor 53, and for continuously varying its speed from a maximum to a minimum value over a continuously variable speed control range. Preferably, the control 51 upon turn-on drives motor 53 at full speed to provide adequate starting torque and also maximum cleaning action with the room air filter upon initial turn-on. Rotation of the control knob 52 in the proper direction will then reduce the speed of the motor in a continuously variable manner down to a minimum speed required to maintain a clean room. Electrical power is supplied to the motor 53 through control 51 from a conventional 110 volt, 60 cycle, 15–20 amp household or office outlet of alternating electric current supplied through power supply cord 54.

In operation the improved room air filter will clean room air more rapidly, maintain a higher level of clean air, produce less draft relative to air cleaning capacity and at a price comparable to or lower than that of currently available electrostatic room air filters. The improved room air filter, as it is used over a long period of time, will undergo a gradual increase in filtering efficiency and a decrease in the rate of delivery of clean air as a result of buildup of filtered material on the prefilter and on the small particle filter. In contrast to this characteristic, an electrostatic type filter, after extended periods of use will gradually lose the capability of removing dirt from the air but will continue to pass air at a substantially unreduced rate resulting in failure to clean the air properly and occasionally in reintrainment of previously collected material with the resultant discharge of heavily contaminated air into the room. Further, cleaning and maintenance of the small particle filter element is less frequent and one is not exposed to high electrical voltages. More importantly, the improved room air filter does not produce ozone during operation as do the electrostatic filters. Because of the continuously variable air volume control, the rate of flow of clean air can be selected as desired with a unit that can be harmonized with the decor of the room in which it is installed. The room air filter is ready to use as soon as it is unpacked and placed in the room without requiring any ducting, installation or other modifications in the room in which it is to be used. To get the most rapid cleaning of room air, the control dial is set for "high" operation, and the filter allowed to run for a period of 15 to 20 minutes for a standard size room or from 1,000–2,000 cubic feet. After the room air has been initially cleaned, the control unit can be adjusted continuously over an adjustable speed control range as desired to provide a reduced rate of room air filtering so as to achieve a very low noise level and a reduced electric consumption. To turn off, the control dial simply is turned to the off position. While in operation, the unit will remove from the room 90 percent of all particles usually found in room air and having a size range down to 0.005 micron and over 99 percent of all airborne particles in the size range of the pollens and plant spores as well as a substantial amount of odors. Maximum airflow is of the order of 300 cubic feet per minute at full speed with a room air filter unit having size dimensions of 34 inches by 12 inches by 16 inches. All of the filter elements employed in the unit are easily replaced with relatively low cost, prefilter, odor filter and/or main small particle filter assemblies after being dirtied in service.

FIG. 3 of the drawings is a partial perspective view of a fragmentary portion of the housing 11 showing a part of the intake opening 18, and illustrates an alternative and preferred form of construction for supporting the intake grill, coarse prefilter and charcoal odor filter within housing 11. With the arrangement shown in FIG. 3, a relatively coarse, retaining screen shown at 61 is folded into the shape of a rather shallow pan from a pattern configuration such as shown in FIG. 3A. By folding or bending each of the side portions 61a – 61d upwardly and inwardly from the pattern shown in FIG. 3A so as to close the edges on each other, a relatively flat, rectangular, pan-shaped retaining screen can be formed. This rectangular, pan-shaped retaining screen 61 is inserted in the intake opening 18 in the side of housing 11 and stapled into place against a lower supporting flange member 62 which runs along the inside lower edge of the intake opening 18 in housing 11. The upper edge of the retaining screen 61 is stapled to the under surface of the partition 13 so that the screen is firmly held in place. Thereafter, the charcoal or other type odor filter 24 and the coarse fiber prefilter 23 can be placed in the order shown within the space provided by the pan-shaped retaining screen 61 within the opening 18 in housing 11 in the manner shown in FIG. 3B. To retain the two filters in place, a decorative grill 63 is supported over the opening 18 by means of retaining thumb nut screws 64.

The entire arrangement is assembled relationship is shown in partial cross-section in FIG. 3B of the drawing wherein it can be seen that in order to remove and replace the coarse prefilter 23 and/or the charcoal or other type odor filter 24 after they become dirty or depleted in service, all that is required is that the thumb screws 64 be released so as to remove decorative grill 63 to thereby provide access to the coarse prefilter 23 and the charcoal or other type odor filter 24. Further, it will be appreciated that because retaining screen 61 is permanently held in place over the opening 18 by the staples 65, there is no need for an additional safety screen such as 25 shown in FIG. 1, placed over the intake opening in the high volume fan 16. This is due to the fact that it would be impossible for a person to reach through the retaining screen 61 into the fan area. Thus, in addition to somewhat lower cost than the more expensive assembly 19, the arrangement shown in FIGS. 3A – 3B also provides for fewer parts and hence it is a preferred form of construction. If desired, the odor filter 24 could be placed on the discharge side of the small particle filter 31 in a manner that is believed obvious to one skilled in the art.

In addition to the above-described features, depending upon the requirements of a particular user, certain extra, optional features are included which will facilitate use of the air filter and/or enhance its operation. One of the optional features includes the addition of an automatic timer control shown at 71 in FIG. 1 which can be set by an externally accessible control knob 72 to provide time-controlled operation of the on-off speed regulating control 51. With this arrangement, the timer control can be preset to cause the air filter to turn on at some predetermined time in advance of the occupancy of the room, thereafter run the fan at high speed to clean the room, and after an adequate period of high speed cleaning, automatically reduce the speed of the fan down to a level adequate to maintain the room in a clean condition.

Another optional feature is the inclusion of ultraviolet lights shown at 75 and 76 in FIG. 1 which may be mounted in the high pressure plenum chamber 14. The ultraviolet lights 74 and 76 are electrically connected through a conductor 77 to an externally accessible ultraviolet light control 78 mounted on the front panel of the filter unit. If desired, the ultraviolet light control 78 also could be connected into and controlled by the automatic timing control 71, 72. The ultraviolet light upon being turned on, will operate within the high pressure plenum chamber 14 on certain gaseous compounds that otherwise might pass through the odor filter to convert such gaseous compounds into small particles that can be filtered out by the fine fiber filter media. This phenomenon is known to occur when certain hydrocarbon gases, for example, are present in an atmosphere and are treated with ultraviolet light in a manner explained more fully in U.S. Pat. No. 3,102,192 - George F. Skala, Inventor - Issued Aug. 27, 1963. Other similar conversions will occur with other known gaseous compounds in a manner known in the art. By converting these gaseous compounds into small particles with the ultraviolet light and thereafter filtering out the particles with the small particle filter additional room filtering efficiency is obtained.

Figure 4:
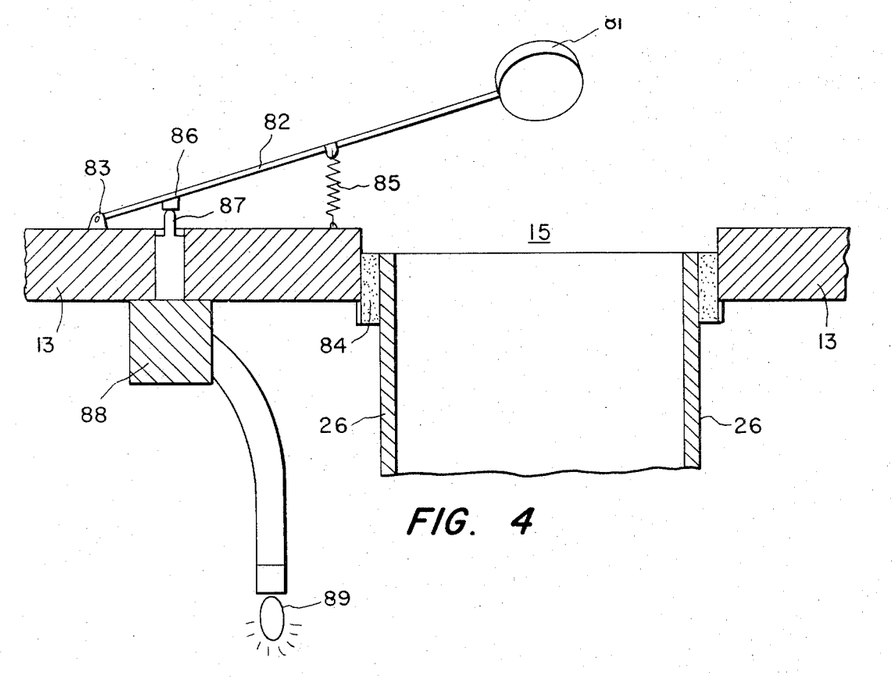
FIG. 4 is a diagrammatic sketch of an airflow sensing and alarm indicating circuit which senses airflow through the room air filter and actuates an alarm light upon the airflow dropping below a predetermined level.

FIG. 4 illustrates still another optional feature which may be included in the improved air filter for monitoring the efficiency of the filter and indicating the need for changing the coarse prefilter or the fine fiber small particle filter. For this purpose, a small light weight vane shown at 81 is mounted in the outlet airstream of the high volume fan 16. Vane 81 is secured at the end of a pivotal lever arm 82 which is rotatably hinged at 83 and supported on the partition 13 which defines the bottom of the high pressure plenum chamber 14. The outlet or discharge duct 26 of the high volume fan 16 is designed to extend upwardly from the space below the partition 13 through opening 15 and discharges into the plenum chamber 14. To maintain the pressure in chamber 14, discharge duct 26 is sealed in opening 15 by means of a peripheral sealing gland shown at 84 formed from foam rubber or other suitable pliable material for sealably securing the fan discharge duct 26 within the opening 15.

The vane 81 may comprise a lightweight metal vane such as aluminum, styrofoam, or other suitable lightweight material having sufficient mass so that in the absence of an airflow out of the fan outlet discharge duct 26, the vane 81 will drop downwardly toward discharge duct 26. To facilitate this action, a small bias spring shown at 85 may be provided which acts on the rotatable lever arm 82 in a direction to draw the vane 81 toward discharge duct 26. The lever arm 82 also includes a contact pad 86 which engages the end or actuating arm 87 of a conventional microswitch 88 upon the vane 81 being drawn downwardly toward the fan outlet discharge duct 26 a sufficient distance. Upon this happening, the microswitch lever arm 87 closes microswitch 88 thereby establishing a closed electric circuit that lights an indicator light shown at 89 mounted on the exterior panel of the room air filter.

In operation, with the coarse prefilter and the small particle filter in relatively new condition, the airflow out of the fan outlet discharge duct 26 will be adequate to blow vane 81 angularly upwardly a sufficient distance to disengage the contact pad 86 from the end of the microswitch lever arm 87 thereby maintaining the microswitch in an open condition and indicating adequate airflow through the air filter. However, as usage accumulates, and dust and dirt builds up in the coarse prefilter and/or the small particle filter, and the airflow out of the discharge duct 26 will reduce to a point such that the upward force acting on vane 81 is inadequate to maintain microswitch 88 in an open condition. Upon this occurrence, the microswitch will close thereby lighting indicator light 89 and signaling the need for a change of filters.

In addition to the above-described filter change signaling function, the arrangement of FIG. 4, also can be used in adjusting operation of the air filter to provide optimum air cleaning at minimum airflow levels (power consumption) in accordance with the condition of the coarse prefilter and/or the small particle filter after some extended period of service but prior to a need for change. For this purpose, it will be appreciated that upon initially placing the air filter in operation after a period of inoperation, the vane 81 will be disposed in its downward position due to the fact that there is no airflow through the fan outlet discharge duct 26 while the air filter is not in operation. Consequently, microswitch 88 will be closed and the indicator light 89 lighted upon initial turn-on of the room air filter. Subsequently, as the fan comes up to speed, it will blow the vane 81 upwardly thereby opening the microswitch 88 and indicating that the filter unit is operating properly provided adequate airflow takes place through the unit.

While the coarse prefilter and the small particle filter are relatively new, it will be appreciated that the airflow out of the fan discharge duct 26 will be adequate to maintain microswitch 88 open even at the minimum fan speed. However, as the period of service of the coarse prefilter and the small particle filter is extended, due to dust accumulation, etc. beyond a point requiring a change of these filter elements, the minimum fan speed may not be adequate to blow vane 81 upwardly and a sufficient distance to maintain microswitch 88 open, and the fan must be operated at some higher speed. Under these conditions, it will be necessary to set the speed of the high velocity fan 16 at a value somewhat above the minimum speed level but below its maximum speed. By appropriately adjusting the speed of the fan and observing the indicator light 89, the lowest possible speed of the fan required to blow vane 81 upwardly enough to maintain microswitch 88 open can be determined. Because the speed of the fan normally also determines the background noise level that the overall air filter unit produces, this feature makes available an additional valuable control over the operation of the unit. Ultimately, if no change in filter units is made, it would be necessary to operate the fan at maximum speed at all times in order to get adequate airflow through the unit. However, even this airflow will be inadequate if the filter element is not ultimately changed so that a point would be reached where at even maximum speed, it would not be possible to blow the van 81 up sufficiently to open microswitch 88. At this point, the airflow through the unit is not providing sufficient air cleaning to justify its operation so that the need for a filter change then becomes absolutely necessary if effective air cleaning is to be obtained.

As an alternative arrangement to that shown in FIG. 4, it is also possible to use an electronic flow sensing arrangement such as a thermistor mounted in the air passageways of the Room Air Filter for measuring airflow in a manner well known in the art. For example, the termistor could be mounted either in the discharge from the high volume fan in the manner of FIG. 4, of could be placed on the discharge site of the small particle filter assembly. By connecting the thermistor in a suitable measuring bridge in a well known manner, a control arrangement capable of performing all of the functions described above with relation to FIG. 4 can be provided.

Figure 5:
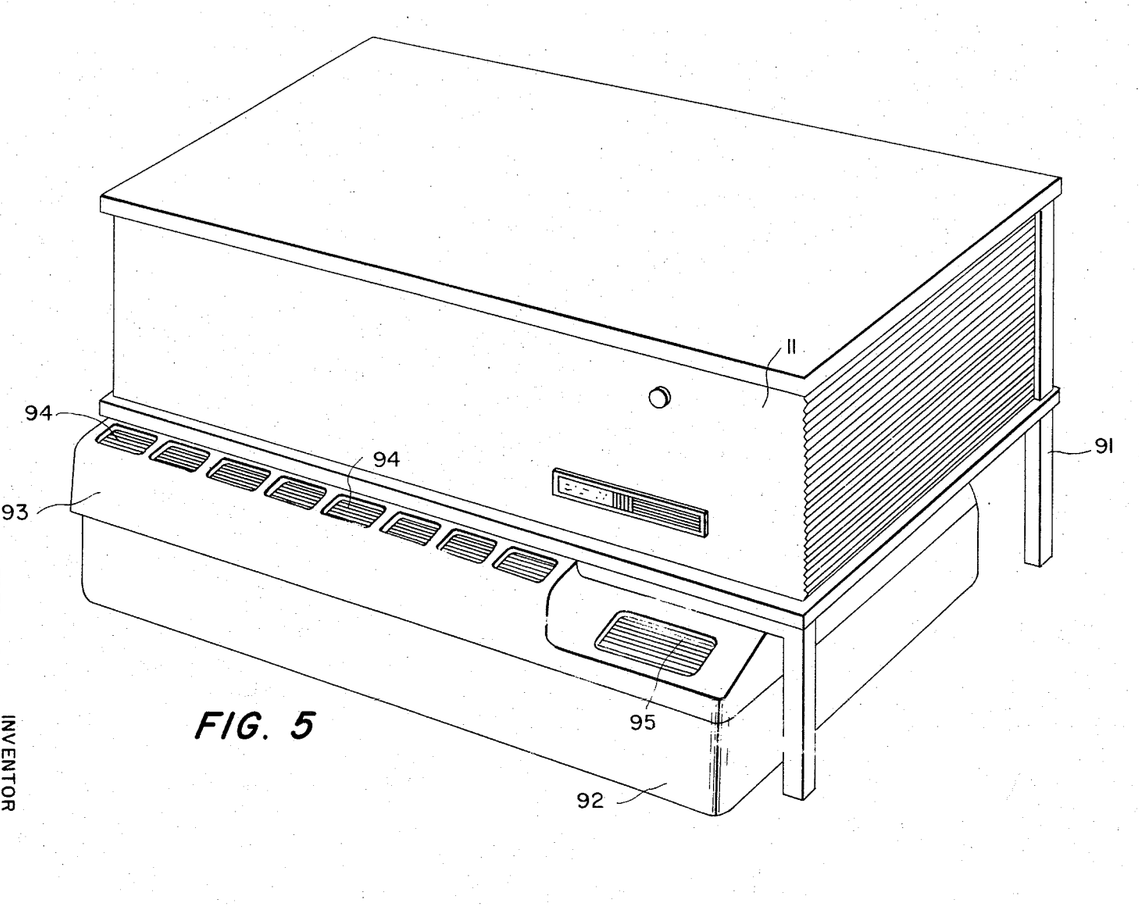
FIGS. 5 and 5A, illustrate some alternative additional structural features which may be compounded with the basic air filter unit shown in FIG. 1 to provide additional air treatment processing such as humidification, etc.
Figure 5A:
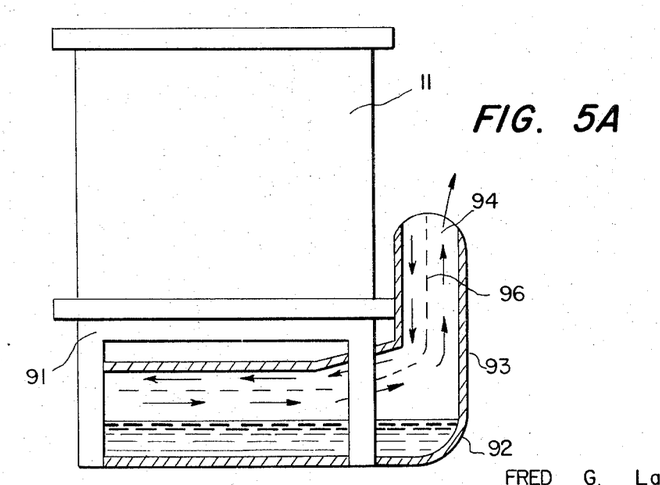

FIGS. 5 and 5A of the drawings illustrate still another alternative, optional feature that may be employed in conjunction with the room air filter in the form of an attachment or otherwise. In the embodiment of the invention shown in FIG. 5A, a room air filter 11 constructed in the manner described with relation to FIG. 1 of the drawings, is supported on a retangularly shaped, relatively low, supporting table 91. Table 91 is not unlike a conventional coffee table and serves to raise the room air filter above the surface of the floor of the room in which it is located. Disposed underneath the supporting table 91 is a retangularly-shaped, box-like, watertight tank 92 which may be of molded plastic or other suitable construction. The tank 92 may be fabricated in two parts and includes an upper top portion 93 having an upwardly extending radiator portion with the outlet vents 94 extending along a substantial part of the length of the top 93, and then drops down to form a depressed pocket or funnel portion into which an inlet opening 95 is formed to facilitate filling the reservoir tank 92 with water and/or other liquids.

FIG. 5A of the drawings best illustrates the construction of the reservoir tank 92 including top portion 93 which is shown in cross-section. From a consideration of FIG. 5A, it will be seen that the top portion 93 also includes an internal partition 96 which separates the upwardly extending raised ridge portion in which the outlet vents 94 are formed into two parts. The upwardly extending raised ridge portion of top 93 including radiator vents 94 also has a series of intake ports formed therein (not shown) which face (oppose) housing 11 and which capture a portion of the diffuse airflow out from the room air filter 11, and diverts this airflow by means of baffles shown in phantom at 96. The captured airflow, as shown by the direction of the arrows, is downwardly over the surface of water or other humidifying liquid maintained in the lower tank portion 92, and then upwardly out through the outlet vents 94. The design of the upwardly extending raised ridge portion 93 containing radiator vents 94 is such that it captures about 20 percent of the total airflow through the room air filter unit; however, by appropriate design this proportion can be varied to meet any need. In this manner, a sufficient portion of the room air being processed is humidified by the water contained in the lower tank portion 92 to maintain the humidity of the room air at a desired level. Maintenance of the water within the lower tank portion 92 is faciliated by the funnel shaped inlet opening 95 formed in one end of top portion 93. It is believed obvious that one could add to the water contained in tank 92 a suitable deodorant, perfume, antiseptic or other liquid treatment prescribed for a particular room in which the air filter is used. Alternatively, liquid treatment of the airstream for purposes of humidification, antiseptic treatment, perfuming, etc. could be achieved by introducing the liquid in the form of a fine spray into the airstream at some point downstream from the small particle filter assembly.

From the foregoing description, it will be appreciated that the present invention provides a new and improved, low cost, highly efficient, portable room air filter for cleaning the air of average sized rooms of a home or office, or the like and which can be placed in the room in the manner of an article of furniture without requiring air ducting installations or other modifications to the room but may be installed ready for operation merely by plugging into a conventional household or office source of alternating electric current. The improved room air filter is capable of removing up to 90 percent of all small particles usually found in the air of an average room down to a size range of the order of 0.005 microns in diameter without requiring high electric voltages needed with conventional electrostatic precipitators heretofore used, and hence produces no ozone. Additionally, by the inclusion of additional optional features, it is possible to remove undesired gaseous components in advance of small particle filtering. Also, it is possible to meter the airflow taking place through the room air filter so as to signal the need for a change of filter units after they have been used in service for a sufficient length of time, and, further, allow setting the operating speed of the air filter at values which provide the most quiet operation commensurate with effective cleaning of the room air regardless of the condition of the filter elements. It is also possible to provide automatic timed control over the operation of the unit so that is is turned on and set at an optimum speed in advance of occupancy of the room. Where desired, it is possible to provide humidification, deodorizing or perfume treatment, etc. of the room air being processed so as to optimize the condition of the room air for occupancy for individuals having differing physical health characteristics and comfort requirements. Further, it is a particularly advantageous feature of the improved room air filter that it becomes more and more efficient in its air cleaning action as it becomes dirty in service up to the point that so little airflow takes place through the unit that the air cleaning achieved does not justify the expenditure of energy in running the unit, at which point the filter elements should be changed.

Having described preferred embodiments of the invention, it is believed apparent that modifications and changes may be made in the particular embodiments disclosed which will be obvious to those skilled in the art in the light of the above teaching. It is therefore to be understood that any such obvious changes and additions are within the full intended scope of the invention as defined by the appended claims.

I claim:

1. In a compact, readily transportable, low cost, efficient room air filter for cleaning the room air of homes, offices and the like the improvement comprising a housing having at least a base, a backwall and two spaced-apart sidewalls, a high volume air fan supported within the housing, relatively high pressure plenum chamber means formed in part by the two spaced-apart sidewalls and with the high volume fan being disposed with its outlet discharging directly into said relatively high pressure plenum chamber means, means connected to the intake of the high volume fan to provide a suction inlet air passageway from exterior of the housing to the intake of the high volume fan, a coarse large particle prefilter disposed in the inlet air passageway, a relatively low cost, fine small particle filter, mounting means for mounting said fine small particle filter in the housing in a position transversely across and comprising at least part of one of the remaining walls of the high pressure plenum chamber means, and outlet means defined in part by said spaced-apart sidewalls for forming an air outlet passageway from said high pressure plenum chamber means through said fine small particle filter for directing the diffuse filtered discharge from the fine small particle filter to exterior of the housing, said relatively low cost fine small particle filter comprising a readily replaceable small particle filter assembly including an outer peripheral support member that defines the intake area of the fine small particle filter, said outer peripheral support member being mounted on said mounting means adjacent the high pressure plenum chamber means and comprising at least part of one side thereof, fine small particle filter media shaped in the form of a multiplicity of adjacent wedge-shaped pockets joined to each other and secured on the support member with the pockets extending out in the direction of airflow and away from the high pressure plenum chamber means, and coarse supporting means that impose little or no pressure drop secured to the wedge-shaped pockets and confining the configuration of a substantial portion of the respective pockets whereby adjacent pockets do not blow out to an extent sufficient to contact one another in a manner that otherwise would result in a restriction of airflow through any of the pockets, and a substantially even pressure gradient is maintained across all of the sides of all of the pockets to assure maximum utilization of the filtering surfaces of the fine small particle filter media and maintenance of steady large volume diffuse airflow caused by suction of the room air through the large particle prefilter into the fan and the discharge of the fan into the relatively high pressure plenum chamber means and through the fine small particle filter to result in diffuse circulation and removal of a substantial portion of all particles usually found in room air which are larger than 0.005 microns in size.

2. A compact room air filter according to claim 1 further including an odor filter disposed in at least one of said air passageways through the room air filter for substantially reducing odors in the room air.

3. A room air filter according to claim 1 wherein said air outlet passageway has at least one side closed by a closure surface formed of readily replaceable, coarsely woven decorator cloth which can be easily changed to conform to the decor of a room or office in which the room air cleaner is disposed and which is sufficiently coarsely woven to provide further diffusion to the airflow from the discharge of the air outlet passageway.

4. A room air filter according to claim 1 wherein the fine small particle filter assembly is removably mounted on the housing support means by said mounting means and said mounting means includes an internal, inflexible mounting flange secured on the housing support means at a location defining at least part of one side of the relatively high pressure plenum chamber means, a filter assembly gasket of a pliable sealing material seated between the mounting ring and the outer support member of the small particle filter assembly, and a plurality of flexible resilient retaining finger means secured on the housing support means at different points around at least a portion of the periphery of the mounting flange and spaced from the filter assembly gasket a short distance to form a retaining grip for receiving the edges of the outer support member of the small particle filter assembly and for firmly clamping the small particle filter assembly in place over the filter assembly gasket on the housing support means.

5. A room air filter according to claim 4 further including a readily removable intake grill secured in the suction air passageway to the intake of the high volume fan, and a coarse wire supporting structure secured within the suction air passageway for supporting the coarse fiber large particle prefilter and an odor filter secured between such grill and such coarse wire supporting structure supplying the intake of the high volume fan whereby removal and replacement of these filters after they have become dirty in service is facilitated.

6. A room air filter according to claim 4 further including an odor filter disposed in at least one of said passageways through the room air filter for substantially reducing odors in the room air.

7. A room air filter according to claim 5 further including sensing and indicating means coupled to the airstream flowing through the inlet and outlet air passageways for sensing decreased airflow through the room air filter and providing an indication of the drop in airflow through the room air filter or increased pressure drop across the filter elements thereby indicating a need for removal and replacement of at least one of the filter elements.

8. A room air filter according to claim 7 further including humidifier means positioned adjacent the housing support means and acting on the airstream passing through the room air filter to thereby humidify the clean air being circulated by the unit, means for introducing a treating agent selected from the group comprising a deodorant, antiseptic, perfume or antibacterial for conditioning the airstream in a prescribed manner, gas conversion means in the form of ultra-violet lamps supported on the housing support means at a point upstream from the fine small particle filter for converting gaseous compounds entrained in the airstream into small particles that can be captured by the small particle filter whereby improved cleansing action of the room air filter is obtained, and timing means coupled to and controlling the operation of at least said high volume fan for automatically controlling turn-on, turn-off and the speed of the fan in accordance with a preset schedule.

9. A room air filter according to claim 1 wherein the housing support means has a multiplicity of sides of balanced proportions such that the housing support means can be stably supported in an attractive manner on more than one of its sides while in use in order to facilitate placement of the air filter in available space within a room or office, and wherein all of the component parts of the room air filter including the high volume fan and the filter elements are securely mounted within the housing support means so as to facilitate safe operation of the room air filter irrespective of its manner of placement.

10. A room air filter according to claim 9 wherein the fine fiber small particle filter assembly is removably mounted within the housing support means by said mounting means and said mounting means includes an internal inflexible mounting flange secured on the housing support means at a location defining at least part of one side of the relatively high pressure plenum chamber, a filter assembly gasket of a pliable sealing material seated between the mounting ring and the outer support member of the small particle filter assembly, and flexible resilient retaining finger means on the housing support means secured at different points around at least a portion of the periphery of the mounting ring and spaced from the filter assembly gasket a short distance so as to define a retaining grip for receiving the edges of the outer support member of the small particle filter assembly in place on the housing support means.

11. A room air filter according to claim 10 further including a readily removable intake grill secured in the suction air passageway to the intake of the high volume fan and a coarse wire supporting structure secured within the suction air passageway for supporting the coarse fiber large particle prefilter and the odor filter between such grill and such supporting structure in the air passageway supplying the intake of the high volume fan whereby removal and replacement of these filters after they have become dirty in service is facilitated.

12. A room air filter according to claim 11 wherein said air outlet passageway has at least one side closed by a closure surface formed of readily replaceable, coarsely woven decorator cloth which can be easily changed to conform to the decor of a room or office in which the room air cleaner is disposed and which is sufficiently coarsely woven to provide further diffusion to the airflow from the discharge of the air outlet passageway.

13. A room air filter according to claim 1 further including humidifier means positioned adjacent the housing support means and coacting with the airstream passing through the room air filter for humidifying the clean air being circulated by the unit.

14. A room air filter according to claim 13 further including means for introducing a treating agent selected from the group comprising a deodorant, perfume, antiseptic or antibacterial into the airstream passing out of the room air filter.

15. A room air filter according to claim 1 further including gas conversion means in the form of ultra-violet lamps supported on the housing support means at a point upstream from the fine small particle filter for converting gaseous compounds entrained in the airstream into small particles that can be captured by the small particle filter whereby improved cleansing action by the room air filter is obtained.

16. A room air filter according to claim 15 further including timing means coupled to and controlling operation of said high volume fan for automatically controlling turn-on, turn-off and the speed of the fan in accordance with a preset schedule.

* * * * *